United States Patent
Krajnc et al.

(10) Patent No.: US 12,513,684 B2
(45) Date of Patent: Dec. 30, 2025

(54) NETWORK CONTROL NODE FOR CONTROLLING PROVISION OF RADIO BEACON SIGNALS

(71) Applicant: SIGNIFY HOLDING B.V., Eindhoven (NL)

(72) Inventors: Hugo José Krajnc, Eindhoven (NL); Leendert Teunis Rozendaal, Valkenswaard (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 256 days.

(21) Appl. No.: 18/275,433

(22) PCT Filed: Feb. 8, 2022

(86) PCT No.: PCT/EP2022/052958
§ 371 (c)(1),
(2) Date: Aug. 2, 2023

(87) PCT Pub. No.: WO2022/171598
PCT Pub. Date: Aug. 18, 2022

(65) Prior Publication Data
US 2024/0314762 A1   Sep. 19, 2024

(30) Foreign Application Priority Data
Feb. 11, 2021 (EP) .................... 21156569

(51) Int. Cl.
*H04W 72/12* (2023.01)
*H04W 48/08* (2009.01)
(Continued)

(52) U.S. Cl.
CPC ........... *H04W 72/12* (2013.01); *H04W 48/08* (2013.01); *H04W 56/004* (2013.01); *H04W 72/0446* (2013.01)

(58) Field of Classification Search
CPC . H04W 72/12; H04W 72/0446; H04W 48/08; H04W 56/004
See application file for complete search history.

(56) References Cited

U.S. PATENT DOCUMENTS 9,055,389 B2    6/2015  Miklós et al.
2008/0205340 A1* 8/2008 Meylan ................. H04W 48/18
                                                          370/331
(Continued)

OTHER PUBLICATIONS

Carhacioglu et al., "Time-Domain Cooperative Coexistence of BLE and IEEE 802.15.4 Networks." Oct. 13, 2017, ieeexplore.ieee.org, 7 pages.

*Primary Examiner* — Jianye Wu

(57) ABSTRACT

The invention is directed to a network control node (100), for controlling provision of radio beacon signals (B1, B2, B3 by network nodes (120, 130, 140) of a wireless communication arrangement (150). The network control node comprises a beacon-control unit (104) connected to a network-data ascertainment unit (102) and configured, using ascertained network node data identifying the network nodes, to generate and provide, to the network nodes, a beacon-provision schedule (BS) indicative of a periodical beacon-provision time-window having a predetermined time-window length for providing the respective radio beacon-signals that is shorter than a beacon signal provision period of the provision of radio beacon signals by the network nodes, thereby reducing the risk of signal collision.

13 Claims, 7 Drawing Sheets

(51) Int. Cl.
  *H04W 56/00*       (2009.01)
  *H04W 72/0446*     (2023.01)

(56) References Cited

U.S. PATENT DOCUMENTS

| | | | |
|---|---|---|---|
| 2015/0382304 A1* | 12/2015 | Park | H04W 56/001 |
| | | | 455/41.2 |
| 2016/0309288 A1 | 10/2016 | Helms et al. | |
| 2017/0038787 A1 | 2/2017 | Baker et al. | |
| 2017/0118089 A1 | 4/2017 | Hur et al. | |
| 2017/0188181 A1 | 6/2017 | Jin et al. | |
| 2017/0353365 A1 | 12/2017 | Li et al. | |
| 2019/0223192 A1 | 7/2019 | Linsky | |
| 2019/0297574 A1 | 9/2019 | Choi et al. | |

\* cited by examiner

NETWORK CONTROL NODE FOR CONTROLLING PROVISION OF RADIO BEACON SIGNALS

CROSS-REFERENCE TO PRIOR APPLICATIONS

This application is the U.S. National Phase application under 35 U.S.C. § 371 of International Application No. PCT/EP2022/052958, filed on Feb. 8, 2022, which claims the benefit of European Patent Application No. 21156569.2, filed on Feb. 11, 2021. These applications are hereby incorporated by reference herein.

FIELD OF THE INVENTION

The invention is directed to a network control node, to a network node, to a wireless communication arrangement, to a method for operating the network control node, to a method for operating the network node, and to a computer program.

BACKGROUND OF THE INVENTION

U.S. Pat. No. 9,055,389 B2 discloses a method for handling beacon signal transmission for discovering devices for device-to-device (D2D) transmission. A network node obtains information from a number of master devices within a specific area comprised in a cellular communication network. The network node then decides properties for beacon signal transmission from a first master device based on the obtained information, and the number of devices within the specific area.

US 2016/309288 A1 discloses broadcasting multiple packets at periodic intervals for receipt by other devices.

SUMMARY OF THE INVENTION

It would be beneficial to reduce the risk of signal collision of radio beacon signals transmitted by network nodes of a wireless communication arrangement.

A first aspect of the present invention is formed by a network control node, suitable for controlling provision of radio beacon signals by a plurality of network nodes in a wireless communication arrangement. The network control node comprises a network-data ascertainment unit that is configured to ascertain network node data identifying the network nodes of the wireless communication arrangement. The network control node also comprises a beacon-control unit connected to the network-data ascertainment unit and configured, using the ascertained network node data, to generate and provide, to the network nodes of the wireless communication arrangement, a beacon-provision schedule indicative of a periodical beacon-provision time-window having a predetermined time-window length for providing the respective radio beacon signals that is shorter than a beacon signal provision period of the provision of radio beacon signals by the network nodes.

Radio beacon signals are radio signals provided by the network node that are used to identify the respective network node. Reception of a radio beacon signal is also indicative of a proximity or a location of the providing network node or of its readiness to perform a given task. Beacon signals may also carry data pertaining to one or more parameters, such as power-supply information, relative address, location, timestamp, signal strength, available bandwidth resources, grouping or clustering with other devices, etc.

The beacon-provision time-window is a time window for providing the respective radio beacon signals and has the predetermined time-window length. The beacon-provision time window repeats periodically with a given period, which is longer than the time-window length. Predetermined timing instructions ensure that the network nodes of the wireless communication arrangement have a respective non-overlapping slot in the beacon-provision time-window for providing the respective radio beacon signals.

The network control node is therefore advantageously configured to coordinate the provision of radio beacon signals by the network nodes of the wireless communication arrangement. Clustering the respective radio beacon signals periodically provided by the respective network nodes within the periodical beacon-provision time-windows enables a reduction of the risk of collision with other wireless communication signals, from the same or other wireless communication arrangement or network, which can be transmitted outside of the beacon-provision time windows to avoid collisions with the radio beacon signals.

In the following, embodiments of the network control node of the first aspect of the invention will be described.

In a preferred embodiment, the radio beacon signals are provided in accordance with a IEEE 802.15.1 communication protocol, in particular Bluetooth, WPAN or Bluetooth low energy (BLE). According to BLE, communication messages, including radio beacon signals are provided without a Clear Channel Assessment (CCA) such that the network nodes providing the BLE beacon signals do not check whether a communication channel is sufficiently free before transmitting. Therefore, the risk of collisions mid-air increases, which lowers the efficiency of communication within the wireless communication arrangement.

In an embodiment, the plurality of network nodes are configured to provide the radio beacon signals with a predetermined beacon repeat rate, indicative of a corresponding beacon-provision period of the network nodes, e.g. 100 ms. The time-window length is 50% of the beacon-provision period (e.g. 50 ms), preferably 25% thereof (e.g. 25 ms), and more preferably equal to or shorter than 20% thereof (equal or less than 20 ms). This means that the radio beacon signals of the plurality of network nodes are provided within a time span that corresponds to a fraction of the beacon-provision period.

In a preferred embodiment, the beacon control unit is further configured to assign to the network nodes of the wireless communication arrangement a rank-value indicative of a respective position in a beacon-provision sequence for periodically providing a radio beacon-signal. The beacon-control unit is also configured to generate and provide the beacon provision schedule being further indicative of the respective rank-values for providing the respective radio-beacon signals in accordance with said respective rank-values, and optionally, also in accordance with the predetermined timing instructions.

In an embodiment, the network-data ascertainment unit is configured to ascertain the network node data by accessing an internal or external data base comprising entries indicative of the network nodes currently belonging to the wireless communication arrangement. In another embodiment, the network-data ascertainment unit is additionally or alternatively configured to ascertain the network node data using the radio beacon signals provided by the network nodes.

In an embodiment, the network node data is also indicative of a number of hops needed to provide the beacon-provision schedule to the respective network nodes. In an embodiment, when all the network nodes are within a single hop distance from the network control node, the network control node is configured to provide the beacon-provision schedule as a broadcast message to all the network nodes of the wireless communication arrangement. If however, not all network nodes are within a single hop distance, the beacon-control unit is configured to determine whether there is at least one target network node that is within a single hop distance from the remaining network nodes and the network control node, and to provide the beacon-provision schedule to the target network node, preferably as a unicast message, for broadcasting the beacon-provision schedule to the remaining network nodes.

In an embodiment, the network control node further comprises a network performance monitoring unit that is configured to monitor one or more predetermined network performance metrics of the wireless communication arrangement. Upon determining that the network performance metric has a value outside a predetermined respective normal-operation range, the network performance monitoring unit is configured to provide a trigger signal indicative thereof. In this particular embodiment, the beacon-control unit also comprises a trigger input unit for receiving the trigger signal, and is further configured to provide the beacon-provision schedule upon reception of the trigger signal.

Suitable network performance metrics include, but are not limited to bandwidth usage, throughput, latency, packet loss, retransmission rate or connectivity.

Bandwidth is a measure of a maximum data transmission rate on a wireless communication arrangement. In an embodiment, the network performance monitoring unit is configured to monitor how much bandwidth is currently being used on the wireless communication arrangement and to determine whether the used bandwidth has a value within the predetermined normal-operation range.

In another embodiment, the network performance monitoring unit is additionally or alternatively configured to monitor a throughput in the wireless communication arrangement. Throughput is a measure of the wireless communication arrangement current data transmission rate, which can vary wildly through different areas of your network. While the network's bandwidth measures the theoretical limit of data transfer, throughput is an indication of how much data is actually being sent and received successfully. Specifically, throughput measures the percentage of data packets that are successfully received; a low throughput means there are a lot of failed or dropped packets that need to be sent again.

In another embodiment, the network performance monitoring unit is additionally or alternatively configured to monitor a latency in the wireless communication arrangement. Latency is related to a delay that happens between a node or device requests data and when that data is finished being delivered.

In another embodiment, the network performance monitoring unit is additionally or alternatively configured to monitor packet loss in the wireless communication arrangement. Packet loss is a measure of how many data packets are dropped during data transmissions on the wireless communication arrangement. The more data packets that are lost, the longer it takes for a data request to be fulfilled.

In another embodiment, the network performance monitoring unit is additionally or alternatively configured to monitor packet retransmission in the wireless communication arrangement. When packets are lost, the wireless communication arrangement typically needs to retransmit it to complete a data request. The retransmission rate is an indication of how often packets are being dropped, which is an indication of congestion on the wireless communication arrangement.

In yet another embodiment in accordance with the first aspect of the invention, the network control node alternatively or additionally comprises a user input unit that is connected to beacon-control unit and configured, upon reception of a user input signal indicative of a request to provide the beacon-provision schedule, to provide a trigger signal indicative thereof. In this embodiment, the beacon-control unit comprises a trigger input unit for receiving the trigger signal, and is further configured to provide the beacon-provision schedule upon reception of the trigger signal.

In another embodiment, the beacon-control unit is configured to provide the beacon-provision schedule further comprising timing-data indicative of respective points in time for providing the radio-beacon signal by the network nodes, the respective points in time being relative to a time of reception of the beacon-provision schedule by the respective network node or to a starting time of the beacon-provision time-window. The timing-data is, in an embodiment, indicative of a respective time amount that a network node of a given rank has to wait after the time of reception of the beacon-provision schedule and after the start of subsequent beacon-provision time-windows, before providing the radio beacon signal. For instance, the timing-data indicates that a network node with a rank-value of "1" can provide the radio beacon signal immediately after reception of the beacon-provision schedule, that a network node of rank-value "2" can provide the radio beacon signal after a waiting time of $t_w$ from the time of reception of the beacon-provision schedule and, generally, that a network node of rank-value "n" can provide the radio beacon signal after a waiting time of $(n-1)*t_w$ from the time of reception of the beacon-provision schedule or from a respective starting time of the periodical beacon-provision time-window. Alternatively, the network node of rank-value "1" is instructed by the beacon-provision schedule to wait the predetermined waiting time $t_w$, such that a network node of rank-value "n" is instructed to provide the radio beacon signal after a waiting time of $n*t_w$ from the time of reception of the beacon-provision schedule or from the starting time of the beacon-provision time-window.

Alternatively, the network of rank-value "1" is instructed by the beacon-provision schedule to wait an initial waiting time $t_i$ different from the predetermined waiting time $t_w$. The network nodes of rank-values higher than 1 are configured to wait a time given by $n*t_w+t_i$ for providing its beacon signal in each beacon-provision time window.

In an alternative embodiment, the beacon-provision schedule includes specific waiting-time data for each of the network nodes. This is particularly advantageous when the network nodes have different performances that could lead to different delays in providing the radio beacon signal. The respective waiting-time data is applied either from the time of reception of the beacon-provision schedule or from the starting time of the beacon-provision time-window.

In another embodiment, the beacon-control unit is also configured to provide to the network nodes of the wireless communication arrangement, a communication-stop signal indicative of a requirement to the network nodes to stop transmission of wireless signals for a predetermined silence time-span. The beacon-control unit is also configured to provide the beacon-provision schedule during the silence time-span. This ensures that the communication channels are free for providing the beacon-provision schedule to the network nodes.

In another embodiment, the network control node additionally comprises a beacon-analysis unit that is connected to the beacon-control unit and configured to receive the beacon-provision schedule, to receive radio beacon signals provided by the network nodes, and, upon determining that one or more of the radio beacon signals have been transmitted by a respective network node outside the beacon-provision time-window, to provide a timing-error signal indicative thereof. In this particular embodiment, the beacon-control unit is further configured to provide the beacon-provision schedule upon reception of the timing-error signal. The beacon-analysis unit is, in an embodiment, integrated in the network-control node. In another embodiment, the beacon-analysis unit is integrated in an external device that is in communication with the network control node, and is configured to provide the timing error signal to the network control node.

In another embodiment, the network control node further comprises an emitter unit configured to provide wireless testing signals to the network nodes of the wireless communication arrangement. The network control node also comprises a transmission determination unit configured to determine whether or not the wireless testing signals have been received by the network nodes and to provide a result signal indicative thereof. In this embodiment the beacon-control unit is further configured to provide the beacon-provision schedule upon reception of the result signal indicative of a failure to receive the wireless testing signals. The wireless testing signals are, in an embodiment, provided in accordance with the same communication protocol as the radio beacon signals, for instance, BLE. In another embodiment, the wireless testing signals are additionally or alternatively provided in accordance with a different communication protocol, for instance a communication protocol based on IEEE 802.15.4, such as Zigbee. Preferably, the network control node is configured to provide the wireless test signals outside of the beacon-provision time-window and then query them to determine whether the reception of the wireless test signals has been successful. Based on a predetermined success rate or mean delay or any other network performance metric, the network control node is configured to issue a new beacon-provision schedule with new data, or to re-issue the previously provided beacon-provision schedule for refreshing the old values or re-starting timers.

According to a second aspect of the present invention, a network node for communicating in a wireless communication arrangement is provided. The network node comprises a radio-beacon provision unit connected to the input unit and configured to provide, in accordance with a first wireless communication protocol, radio beacon signals. The network node further comprises an input unit for receiving, from an external network control node, a beacon-provision schedule indicative of a periodical beacon-provision time window having a predetermined time-window length that is shorter than a beacon signal provision period of the provision of radio beacon signals by the network nodes, for providing the respective radio beacon-signals in accordance with predetermined timing instructions for ensuring that the network nodes of the wireless communication arrangement have a respective non-overlapping slot in the beacon-provision time-window for providing the respective radio beacon signals.

The radio-beacon provision unit is connected to the input unit and is configured, upon reception of the beacon-provision schedule, to provide the radio beacon signal only during the respective periodical beacon-provision time-window indicated by the received beacon-provision schedule.

In the following, embodiments of the network node of the second aspect of the invention will be described.

In an embodiment, the input unit is configured to receive the beacon-provision schedule being further indicative of rank-values indicative of respective positions in a beacon-provision sequence for periodically providing a radio beacon-signal in accordance with said rank-values.

In an embodiment, the network node, before receiving the beacon-provision schedule, is configured to provide beacon signals in accordance with the first wireless communication arrangement, such as for instance, BLE. According to the BLE communication protocol, BLE beacon signals are emitted without clear channel assessment at regular intervals, e.g. 100 ms, but with a random or pseudo-random offset, e.g. 10 ms. Each beacon signal for advertisement lasts for up to 376 µs. In a normal deployment, there are no mechanisms to ensure that the provision of radio beacon signals from different network nodes are coordinated.

In an embodiment, the network node of the second aspect also comprises a communication-signal provision unit connected to the input unit and configured to provide, in accordance with the first wireless communication protocol or with a second wireless communication protocol different than the first wireless communication protocol, and upon reception of the beacon-provision schedule, wireless communication signals outside the beacon-provision time-window, and preferably only outside the beacon-provision time slot. In a preferred embodiment the radio beacon signals are provided in accordance with BLE and the communication signals are provided in accordance with a IEEE 802.15.4 wireless communication protocol, such as, but not limited to, Zigbee.

In an embodiment, the network node comprises a combo-communication transceiver which supports network connections in accordance with the first and the second wireless communication protocols. The combo-communication transceiver includes the radio-beacon provision unit and the communication signal provision unit. For instance, an embodiment comprises a Bluetooth/Zigbee BLE combo-communication transceiver which supports network connections in accordance and Zigbee an BLE. For simplicity, these combo-communication transceivers share as many resources as possible, including, for example, a radio front-end and electronics, meaning that the combo-communication transceiver can effectively only send messages using a single communication protocol at a given point in time. This means that while the radio-beacon provision unit is for instance transmitting the BLE radio beacon signals, the communication-signal provision unit is not transmitting (or receiving) any communication via Zigbee, and the network node cannot be reached by other network nodes during that time. Therefore, the higher the usage of one of the wireless communication protocols the lower is the available time for using the other wireless communication protocol.

In another embodiment, the radio-beacon provision unit is further configured to periodically provide radio beacon signals at a predetermined point in time within the beacon-provision time-window that depends on the rank-value assigned to the network node in the beacon-provision sequence.

In an alternative embodiment, the radio-beacon provision is further configured:
  upon determining that the network node has a first position in the beacon-provision sequence, to provide a first radio beacon signal upon reception of the beacon-provision schedule and to provide subsequent radio beacon signals spaced in time a period of the periodical beacon-provision time-window, and
  upon determining that the network node has a position in the beacon-provision sequence other than the first position, to provide a respective radio beacon signal upon reception of that radio beacon signal provided by that network node with an immediately preceding position in the beacon-provision sequence.

Thus, the network node having a rank-value of "1" provides its radio beacon signal upon receiving the beacon-provision schedule and then at the start of each subsequent beacon-provision time-window. The network node having been assigned a rank-value of "n", with n>1, is configured to provide the radio beacon signal upon receiving the radio beacon signal provided by the network node of rank "n−1".

In an embodiment, the network node is further configured, upon reception of the beacon-provision schedule, to determine a time span between the reception of the beacon-provision schedule and a reception of the radio beacon signal from the network node with an immediately preceding position in the beacon-provision sequence. For the subsequent beacon-provision time-window, the network node is configured to provide the radio beacon signal at a point in time that depends on the determined time span, after the start of the beacon-provision time-window. In this embodiment, the provision of the radio beacon signal is guaranteed even in the case that the preceding network node gets disconnected or is otherwise unable to provide its radio beacon signal.

According to a third aspect of the present invention, a wireless communication arrangement is disclosed. The wireless communication arrangement comprises two or more network nodes in accordance with any of the embodiments of the second aspect of the invention and one network control node in accordance with any of the embodiments of the first aspect of the invention.

In an embodiment, the wireless communication arrangement is a lighting arrangement including network nodes in the form of lighting units, sensors, switches, plugs, etc., that are configured to communicate with each other via a bridge device using, for example a IEEE 802.15.4 wireless communication protocol, such as Zigbee. Additionally, at least some of the network nodes are configured to provide radio beacon signals in accordance with, for example BLE. The radio beacon signals are sent by the network nodes with a predetermined frequency and without a clear channel assessment CCA. On the other hand, for Zigbee-based communication, the network nodes check whether the communication channel is free before they start the transmission of the communication signal. For example, a CCA check takes 128 µs, i.e. eight symbol periods where each symbol is four bits at 250 kHz. If a radio beacon signal is transmitted during this time, the network node delays the provision of the communication signal in accordance with the Zigbee wireless communication protocol and retry again. The consequence is that when there are many BLE radio beacon signals being transmitted, the Zigbee-based communication signal might not get a chance to be transmitted, or only transmitted after several attempts, leading to lower throughput and higher latency.

In the lighting arrangement, the network nodes are configured to communicate with the bridge device via Zigbee and are also configured to periodically transmit BLE radio beacon signals, for instance for presence or movement sensing or for device localization or for asset tracking. Asset tracking is, for instance, performed by means of having the network nodes transmit the radio beacon signals and have them received and processed by, for instance, a moving object such as a smartphone. This allows a user, through the smartphone as proxy, to be detected or tracked with respect to the network nodes emitting the radio beacon signals. Alternatively, the tracked asset is the network node providing the radio beacon signals, since this requires a reduced amount of power and computational resources. When the presence or movement sensing, or the device localization, or the asset tracking function is activated, a user may notice that the lights, i.e. some of the network nodes, take longer to react to inputs form the sensors, or switches. A main cause for this behavior is that the network nodes are emitting the radio beacon signals in a non-coordinated way, which leads to delays for preventing mid-air collisions or to messages being missed, since some individual network nodes are busy communicating (transmitting or receiving) on BLE instead of communicating (transmitting or receiving) on Zigbee. This effectively reduces the Zigbee transmission capacity and increases the latency of the wireless communication arrangement. For example, if BLE beacon signals are being sent, they need to be received by a network node. If that node comprises a combo chip operable under Zigbee and BLE, it will need to periodically, or dictated in some other way, switch from Zigbee to BLE in receiving mode to see if anyone has sent anything, since as noted before, the transmissions are not coordinated. For the impact of the network, therefore, anything being done on one communication protocol affects the performance of the other communication protocol. Also, being busy on BLE can affect both transmission or reception of a Zigbee message. The message might be missed by a network node A because a different network node B is currently busy and cannot transmit it in the first place, or because network node A is currently busy communicating on BLE and cannot receive the Zigbee message that network node B has effectively sent.

The network control node is advantageously configured to generate and provide the beacon-provision schedule indicative of the periodical beacon-provision time-window, and preferably also indicative of the respective rank-values, so that the provision of the radio-beacon signals by the network nodes, for instance for performing the presence sensing function, is clustered during the beacon-provision time-window. Additionally, there is a second available window, i.e. between any two consecutive beacon-provision time-windows, for transmitting the communication signals in accordance with the first or the second communication protocol if necessary, with a lower risk of mid-air collisions with the radio beacon signals.

In an embodiment, the network control, preferably but not necessarily a bridge or routing device of the wireless communication arrangement, is configured to provide the beacon-provision schedule indicative of the respective rank-values that corresponds to a desired order in which the network nodes are expected to provide the radio beacon signals. The beacon-provision schedule is further indicative of a respective amount of time that has to be waited before providing the radio beacon signal. The respective amount of time is included in the timing-data. In an embodiment, the timing-data is indicative of an absolute time amount to be waited relative to the time of reception of the beacon-provision schedule by the respective network node or to the starting time of the beacon-provision time-window, and in another embodiment, the timing-data is indicative of a single time span, e.g. 10 ms, and the network nodes are configured to ascertain their respective waiting times. This is done, for instance, by multiplying the respective rank-value, or a value depending on the respective rank-value, by the single time span. Therefore, the provision of radio beacon signals is clustered within the beacon-provision time-window, effectively leaving more free time for other types of communication, such as Zigbee communications.

Further, some network nodes that are battery powered are advantageously configured, after having received the beacon-provision schedule to turn-on their BLE communication unit only during the beacon-provision time-window.

In another embodiment, the network nodes, after reception of the beacon-provision schedule, and in dependence on their assigned rank-value, are configured:
a) if the network node is the network node with the first rank-value, to provide a first radio beacon signal upon reception of the beacon-provision schedule and to provide subsequent radio beacon signals spaced in time a period of the periodical beacon-provision time-window; and
b) if the network node has a rank-value other than the first rank-value, to provide a respective radio beacon signal upon reception of that radio beacon signal provided by that network node with an immediately preceding position in the beacon-provision sequence.

In an embodiment, the network node is further configured, upon reception of the beacon-provision schedule, to determine a time span between the reception of the beacon-provision schedule and a reception of the radio beacon signal from the network node with an immediately preceding position in the beacon-provision sequence. For the subsequent beacon-provision time-window, the network node is configured to provide the radio beacon signal at a point in time that depends on the determined time span, after the start of the beacon-provision time-window. In this embodiment, the provision of the radio beacon signal is guaranteed even in the case that the preceding network node gets disconnected or is otherwise unable to provide its radio beacon signal.

In another embodiment, one or more of the networks nodes comprise a beacon monitoring unit, configured, upon joining the wireless communication arrangement, to monitor provision of radio beacon signals by other network nodes and to determine the number of network nodes providing radio beacon signals and the time-length and period of the beacon-provision time-window. The radio-beacon provision unit is then configured to provide the radio beacon signal after the network node of the last rank-value has provided its radio beacon signal. Preferably, the beacon monitoring unit is also configured to monitor time differences between reception of two consecutive radio beacon signals, to determine an average time-difference between reception of two consecutive radio beacon signals and to provide its radio beacon signal at a point in time after reception of the radio beacon signal of the network node ranked last that depends on the determined average time difference.

Additionally, or alternatively, the beacon monitoring unit is configured, using the monitored time differences, to determine whether a radio beacon signal can be provided between two given consecutive radio beacon signals, and in case one or more time differences allow for a provision of a radio beacon signals without interference, the radio-beacon provision unit is configured to provide the radio beacon signal between the two given consecutive radio signals.

According to a fourth aspect of the invention, a method for operating a network control node for controlling provision of radio beacon signals by a plurality of network nodes in a wireless communication arrangement is disclosed. The method comprises:
ascertaining network node data identifying the network nodes of the wireless communication arrangement;
using the ascertained network node data, generating and providing, to the network nodes, a beacon-provision schedule indicative of a periodical beacon-provision time-window having a predetermined time-window length that is shorter than a beacon signal provision period of the provision of radio beacon signals by the network nodes, for providing the respective radio beacon-signals in accordance predetermined timing instructions which ensure that the network nodes of the wireless communication arrangement have a respective non-overlapping slot in the beacon-provision time-window for providing the respective radio beacon signals.

In the following, embodiments of the method of the fourth aspect are described.

In a preferred embodiment the method includes, using the ascertaining network node data, assigning to the network nodes of the wireless communication arrangement a rank-value indicative of a respective position in a beacon-provision sequence for periodically providing a radio beacon-signal and generating the beacon-provision schedule being further indicative of the respective rank values, such that the radio-beacons signals are provided in accordance with the respective rank-values.

In an embodiment, the method comprises:
monitoring one or more predetermined network performance metrics of the wireless communication arrangement;
upon determining that the network performance metric has a value outside a predetermined normal-operation, providing a trigger signal indicative thereof; and
providing the beacon-provision schedule upon reception of the trigger signal.

A fifth aspect of the invention is formed by a method for operating a network node. The method comprises:
receiving a beacon-provision schedule indicative of rank-values indicative of respective positions in a beacon-provision sequence for periodically providing a radio beacon-signal and indicative of a periodical beacon-provision time window having a predetermined time-window length, for providing the respective radio beacon-signals in accordance predetermined timing instructions, and preferably also in accordance with respective rank-values; and
upon reception of the beacon-provision schedule, providing the radio beacon signal only during the respective periodical beacon-provision time-window indicated by the beacon-provision schedule.

A sixth aspect of the present invention is formed by a computer program that comprises instructions which, when executed by a computer, cause the computer to carry out the method of the fourth or the fifth aspect of the invention.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
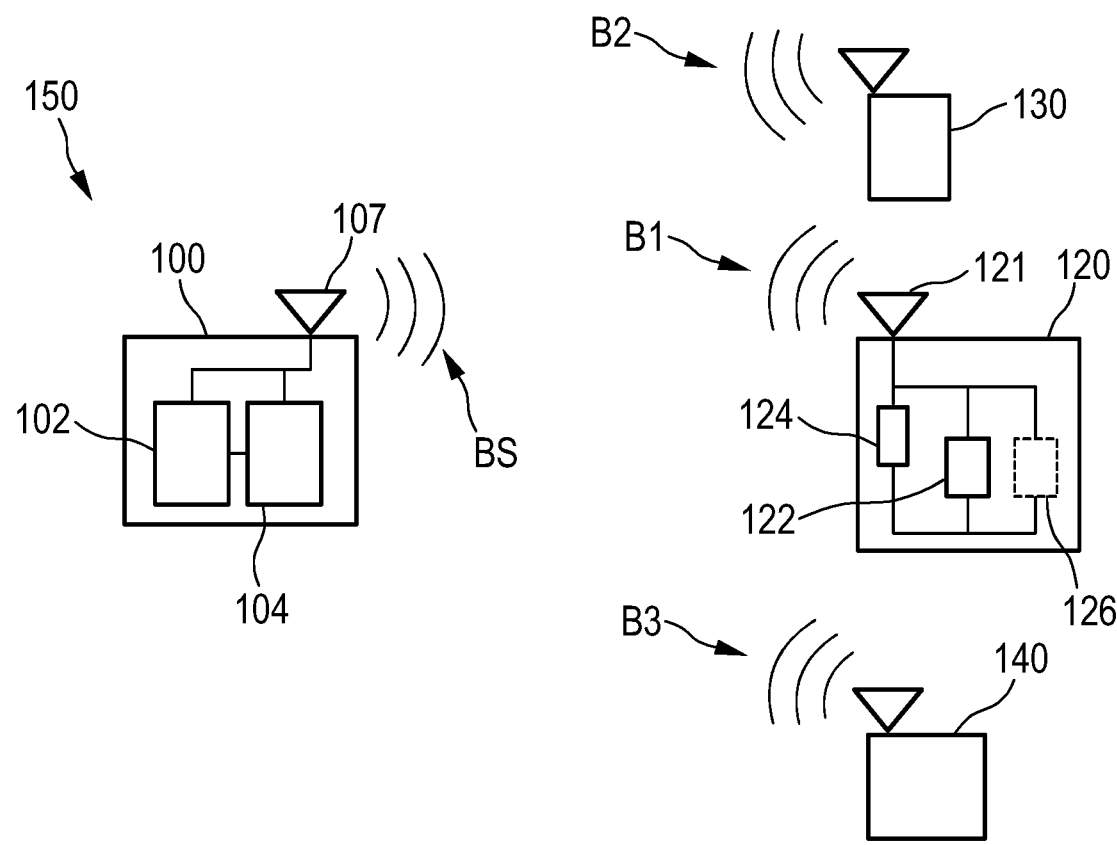
FIG. 1 shows a schematic block diagram of a wireless communication arrangement including a network control node and a plurality of network nodes.

FIG. 1 shows a schematic block diagram of a wireless communication arrangement 150 including a network control node 100 and a plurality of network nodes 120, 130, 140. The network control node 100 is configured to control provision of radio beacon signals B1, B2, B3 by the plurality of network nodes 120, 130, 140 of the wireless communication arrangement 150 in a controlled manner. Exemplarily, the wireless communication arrangement is a lighting arrangement, wherein the network nodes are wirelessly controllable lighting devices, as well as sensors and switches that control the wirelessly controllable lighting devices. The network control node 100, for instance but not necessarily a bridge, or a router device, comprises a network-data ascertainment unit 102 configured to ascertain network node data identifying the network nodes 120, 130, 140 of the wireless communication arrangement 150. For instance, in a particular network control node, the network-data ascertainment unit is configured to ascertain the network node data by accessing an internal or external data base comprising entries indicative of the network nodes currently belonging to the wireless communication arrangement. In another particular network control node, the network-data ascertainment unit is additionally or alternatively configured to ascertain the network node data using the radio beacon signals provided by the network nodes.

The network control node also comprises a beacon-control unit 104 that is connected to the network-data ascertainment unit 102 and preferably configured, using the ascertained network node data to assign to the network nodes of the wireless communication arrangement a rank-value indicative of a respective position in a beacon-provision sequence for periodically providing a radio beacon-signal. For instance, the network-data ascertainment unit has determined that network nodes 120, 130 and 140 are currently part of the wireless communication arrangement and the beacon-control unit internally assigns a rank-value of 1 to network node 120, a rank-value of 2 to network node 130 and a rank-value of 3 to network node 140. The beacon-control unit is configured to generate and provide, to the network nodes, a beacon-provision schedule BS, preferably being indicative of the respective rank-values 1, 2, 3. The beacon-provision schedule is indicative of a periodical beacon-provision time-window 101, 103, 105 having a predetermined period T and a predetermined time-window length $t_l$ for providing the respective radio beacon-signals B1, B2 and B3, in accordance with the respective rank-value and predetermined timing instructions, that ensure that the network nodes of the wireless communication arrangement have a respective non-overlapping slot in the beacon-provision time-window for providing the respective radio beacon signals. The predetermined time-window length is shorter than a beacon signal provision period of the provision of radio beacon signals by the network node in accordance with the corresponding communication protocol. This is explained below with reference to FIG. 2. The reception and provision of wireless signals is carried out by a transceiver unit 107 including suitable electronic circuitry and antenna.

FIG. 1 also shows a schematic block diagram of a network node 120 of the wireless communication arrangement 150. This description also applies to network nodes 130 and 140, however the individual features of these network nodes are nor shown for the sake of clarity.

The network node 120 is suitably arranged for communicating with other network nodes 130 and 140 and with the network control node 100 in the wireless communication arrangement 150. The network node comprises a radio-beacon provision unit 122 configured to provide, in accordance with a first wireless communication protocol, and via a transceiver unit 121, radio beacon signals B1 that comprise network node data identifying the network node 120. The network node 120 also comprises an input unit 124 for receiving, from the network control node 100, the beacon-provision schedule BS indicative of rank-value, in this case "1" associated to respective position (in this case the first position) in a beacon-provision sequence for periodically providing the radio beacon-signal B1. As explained above, the beacon-provision schedule is also indicative of a periodical beacon-provision time window having a predetermined period T and a predetermined time-window length. The beacon-provision time-window is defined for providing the radio beacon-signals B1, B2 and B3 in accordance with the respective rank-values and predetermined timing instructions that ensure that the network nodes of the wireless communication arrangement have a respective non-overlapping slot in the beacon-provision time-window for providing the respective radio beacon signals.

In particular, the radio-beacon provision unit 122 is connected to the input unit 124 and configured, upon reception of the beacon-provision schedule BS, to provide the radio beacon signal only during the respective periodical beacon-provision time-window indicated by the beacon-provision schedule. Optionally, the network node 120, and network nodes 130 and 140 further comprise a communication-signal provision unit 126 that is connected to the input unit and configured to provide wireless communication signals for communication with the other network nodes or the network control node 100. The provision of the wireless communication signals is either in accordance with the first wireless communication protocol or with a second wireless communication protocol different than the first wireless communication protocol. After reception of the beacon-provision schedule, the network nodes are configured to provide the wireless communication signals outside the and preferably only outside the beacon-provision time-window for reducing the risk of signal collision.

In the exemplary wireless communication arrangement 150 of FIG. 1, network node 120, comprises a combo-communication transceiver 121 which supports network connections in accordance with the first and the second wireless communication protocols. The combo-communication transceiver 121 includes the radio-beacon provision unit 122 and the communication signal provision unit 126. In this particular example, transceiver 121 is a Bluetooth/Zigbee BLE combo-communication transceiver which supports network connections in accordance and BLE and IEEE 802.15.4, being BLE the first wireless communication protocol for providing the radio beacon signals and IEEE 802.15.4, e.g. Zigbee, for providing the wireless communication signals. For simplicity, these combo-communication transceivers share as many resources as possible, including, for example, a radio front and electronics, meaning that the combo-communication transceiver can effectively only send messages using a single communication protocol at a given point in time. This means that while the radio-beacon provision unit is for instance transmitting the BLE radio beacon signals, the communication-signal provision unit is not transmitting (or receiving) any communication via Zigbee, and the network node cannot be reached by other network nodes during that time. Therefore, the higher the usage of one of the wireless communication protocols the lower is the available time for using the other wireless communication protocol. The radio beacon signals are sent by the network nodes with a predetermined frequency and without a clear channel assessment CCA.

On the other hand, for Zigbee-based communication, the network nodes have to check whether the communication channel is free before it starts the transmission of the communication signal. For example, a CCA check takes 128 μs, i.e. eight symbol periods where each symbol is four bits at 250 kHz. If a radio beacon signal is transmitted during this time, the network node delays the provision of the communication signal in accordance with the Zigbee wireless communication protocol and retry again.

The consequence is that when there are many BLE radio beacon signals being transmitted, the Zigbee-based communication signal might not get a chance to be transmitted, leading to lower throughput and higher latency.

In the exemplary wireless communication arrangement adapted as a lighting arrangement, the network nodes and the network control node communicate via Zigbee for controlling the operation of the lighting devices and, at the same time are configured to provide beacon signals using BLE for performing a presence sensing function or a device localization function, for example relying on a received signal strength indication of the radio beacon signals or on a channel state indication of a wireless communication link between two nodes of the lighting arrangement or on any other suitable signal-quality metric.

Figure 2A:
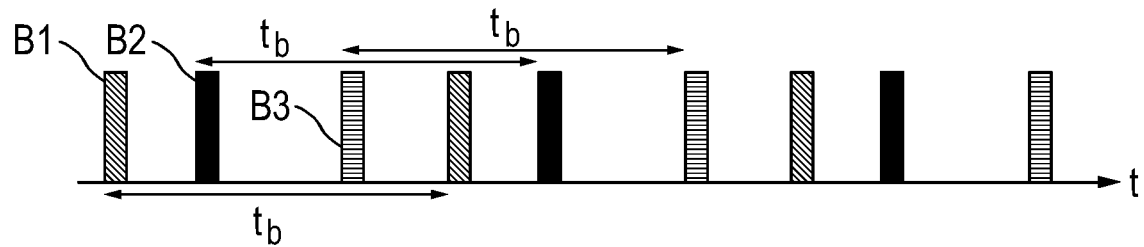
FIGS. 2A and 2B show respective timelines indicating provision of signals, including radio beacon signals and the beacon-provision schedule BS before a) and after b) receiving the beacon-provision schedule.
Figure 2B:
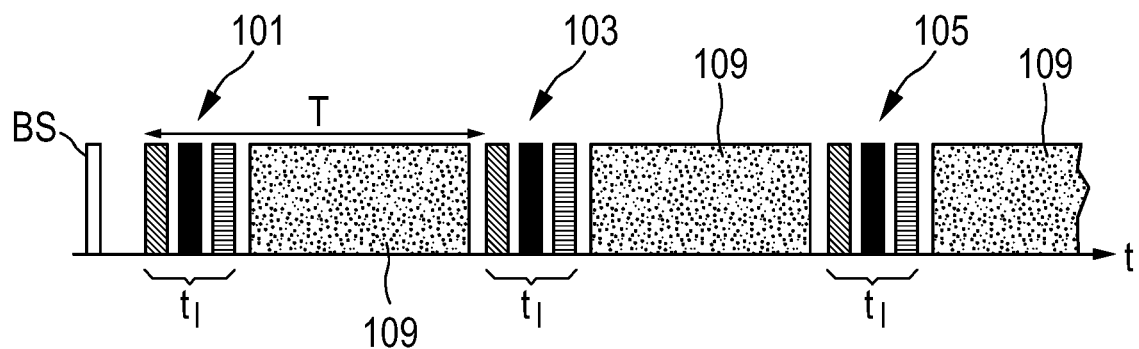

FIGS. 2A and 2B show respective timelines indicating provision of signals, including radio beacon signals B1, B2 and B3 and the beacon-provision schedule BS before a) and after b) receiving the beacon-provision schedule. FIG. 2A shows an exemplary transmission of radio beacon signals B1, B2, B3 by the network nodes of the wireless communication arrangement 120, 130 and 140 respectively. Whenever network node 120 wants to transmit a wireless communication signal using the second wireless communication protocol, such as Zigbee, the network node is configured to check whether the channel is free. If a radio beacon signal is being currently provided, the network node does not transmit the wireless communication signal and has to wait a predetermined time before retrying the transmission. In the situation depicted in FIG. 2A there is a significant change that the Zigbee message will be delayed, leading to lower throughput and higher latency as indicated above.

Network nodes are configured to provide the radio beacon signals at regular intervals $t_b$, i.e., the beacon signal provision period, with some random offset (not shown). For example, the regular intervals are 100 ms and the random offset is up to 10 ms. The network control node 100, in particular the network-data ascertainment unit 104, is aware that there are currently three network nodes other than the network control node 100 in the wireless communication arrangement 150. This data is ascertained for example by listening to the radio beacon signals provided and receiving the identifying data. The beacon-control unit, is then configured to assign to the network nodes 120, 130 and 140 a respective rank-value indicative of a respective position in a beacon-provision sequence for periodically providing a radio beacon-signal. The beacon-provision sequence is in this particular case 120, 130 and 140, or in other words, network node 120 is assigned the first rank-value, network node 130 is assigned the second rank-value and network node 140 is assigned the third rank-value. The beacon-control unit is also configured to generate and provide the beacon-provision schedule BS to the network nodes 120, 130 and 140. The beacon-provision schedule comprises data indicative of the respective rank-values and also data indicative of a periodical beacon-provision time-window 101, 103, 105. Each beacon-provision time-window has a predetermined time-window length $t_l$, within which the radio beacon-signals are to be provided. The beacon-provision time-window repeats with a period of T, which is, for instance, the value of the regular interval to at which the beacons are provided in accordance with the first wireless communication protocol, such as BLE. However, the period of repetition of the beacon-provision time-window can adopt a different value, depending for instance on a number of network nodes in the wireless communication arrangement.

After reception of the beacon-provision schedule BS, the network nodes are configured to provide the radio beacon signals in an order determined by the rank-value and within the beacon-provision time-windows, three of which are shown in FIG. 2B, namely 101, 103, 105. Between two consecutive beacon-provision time-window there is a dedicated time-window 109 for communicating other signals than radio-beacon signals, such as Zigbee wireless communication signals, which are provided outside the beacon-provision time-window and therefore have a reduced the risk of signal collision with the radio beacon signals.

Figure 3:
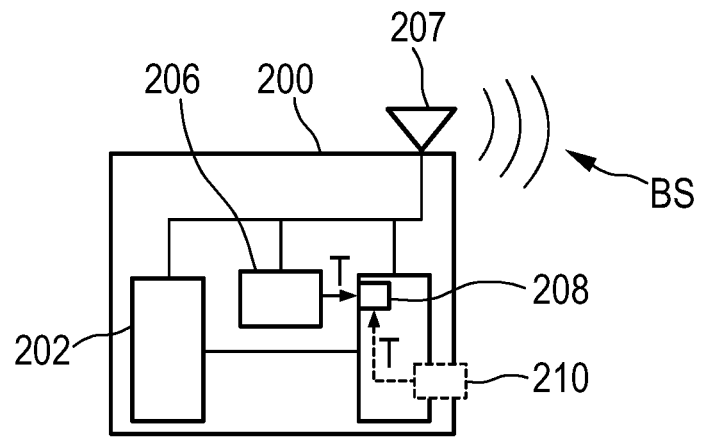
FIG. 3 shows a schematic block diagram of an embodiment of a network control node.

FIG. 3 shows a schematic block diagram of an embodiment of a network control node 200. The following discussion focuses on the technical features that differentiate network control node 100 of FIG. 1 from network control node 200 of FIG. 3. Those technical features having a similar or identical function are referred to using the same numerals, except for the first digit, which is "1" for network control node 100 and "2" for network control node 200.

The network control node 200 further comprises a network performance monitoring unit 206 that is configured to monitor one or more predetermined network performance metrics of the wireless communication arrangement. Suitable network performance metrics include, but are not limited to bandwidth usage, throughput, latency, packet loss rate, retransmission rate, or network availability.

The network performance monitoring unit 206 is also configured, upon determining that the network performance metric has a value outside a predetermined respective normal-operation range, to provide a trigger signal T indicative thereof. In this exemplary network control node, the beacon-control unit 204 comprises a trigger input unit 208 for receiving the trigger signal T. The beacon-control unit 208 is further configured to provide the beacon-provision schedule BS upon reception of the trigger signal.

The network control node 200 can also be used instead of network control node 100 in the wireless communication arrangement 150. When the beacon signals are provided as shown in FIG. 2A such that the communication using the Zigbee protocol leads to significant delays or reduced throughput, thereby reducing the expected performance of the arrangement, the network performance monitoring unit provides the trigger signal which causes the generation and provision of the beacon-provision schedule. The use of this exemplary network control node is also beneficial in cases wherein new network nodes join the wireless communication arrangement. Newly added network nodes have not necessarily received the beacon-provision schedule and will provide the radio beacon signals with the stipulated time interval, such as $t_b$, and the corresponding offset, as explained above, with reference to FIG. 2A. If the provision of these new beacon signals interferes with the communication between network nodes such that the performance of the network falls significantly, the beacon-control unit receives the trigger signal T and issues a new beacon-provision schedule, this time taking into account the newly added network nodes.

Optionally, the network control node additionally or alternatively comprises a user input unit 210 connected to beacon-control unit 204 and configured, upon reception of a user input signal indicative of a request to provide the beacon-provision schedule, to provide a trigger signal T indicative thereof. In this particular network control node, the beacon-control unit receives the trigger signal at the trigger input unit 208, and is also configured to provide the beacon-provision schedule BS upon reception of the trigger signal T.

Figure 4:
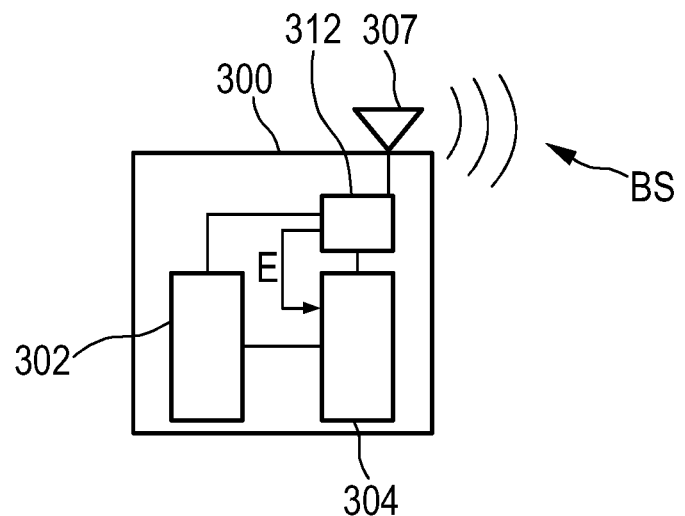
FIG. 4 shows a schematic block diagram of another embodiment of a network control node.

FIG. 4 shows a schematic block diagram of another embodiment of a network control node 300. The following discussion focuses on the technical features that differentiate network control node 300 of FIG. 4 from network control nodes 200 of FIG. 3 and 100 of FIG. 1. Those technical features having a similar or identical function are referred to using the same numerals, except for the first digit, which is "1" for network control node 100 and "2" for network control node 200 and "3" for the network control node 300 of FIG. 4.

The network control node 300 further comprises a beacon-analysis unit 312 that is connected to the beacon-control unit 304 and configured to receive the beacon-provision schedule and to receive radio beacon signals provided by the network nodes. Upon determining that one or more of the radio beacon signals have been provided outside a respective beacon-provision time-window, the beacon-analysis unit is configured to provide a timing-error signal E indicative thereof. In the network control node 300, the beacon-control unit 304 is further configured to provide the beacon-provision schedule upon reception of the timing-error signal E. This is particularly advantageous in case new network nodes are added to the wireless communication arrangement, which are configured to provide radio beacon signals after having joined the arrangement.

Figure 5:
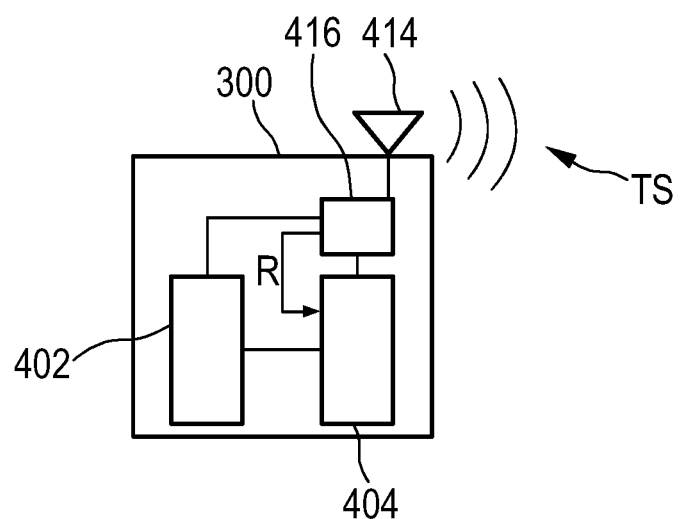
FIG. 5 shows a schematic block diagram of another embodiment of a network control node.

FIG. 5 shows a schematic block diagram of another embodiment of a network control node 400. The following discussion focuses on the technical features that differentiate network control node 400 of FIG. 5 from network control nodes 300, 200 and 100 of FIGS. 4, 3, and 1 respectively. Those technical features having a similar or identical function are referred to using the same numerals, except for the first digit, which is "4" for network control node 400 of FIG. 5.

The network control node 400 also comprises an emitter unit 414, which is part of the transceiver unit and that is configured to provide wireless testing signals TS to the network nodes of the wireless communication arrangement. The network control node also comprises a transmission determination unit 416 configured to determine whether or not the wireless testing signals have been received by the network nodes and to provide a result signal R indicative thereof. In this exemplary network control node, the beacon-control unit 404 is further configured to provide the beacon-provision schedule upon reception of the result signal indicative of a failure to receive the wireless testing signals.

This particular network control node is thus advantageously configured to measure the effectiveness of the beacon clustering process. This is performed by providing the wireless testing signals, which may be dummy Zigbee messages, preferably at points in time outside the beacon-provision time-window. The wireless testing signals are then queried to check how many successful receptions there has been. Based on a success rate, compared to a minimum success rate, the network control node is configured to provide a result signal. When this result signal is indicative of a success rate below the minimum success rate, the beacon-control unit, which is configured to receive the result signal, provides the beacon-provision schedule. Depending on the currently ascertained network node data and, optionally also on the result signal, the beacon-provision schedule is either re-sent as it was sent before, or modified with respect to the previously provided beacon-provision schedule. In the former case the provision of the beacon-provision schedule acts as a reset instruction for the network nodes and in the latter case it acts as an update instruction.

Figure 6:
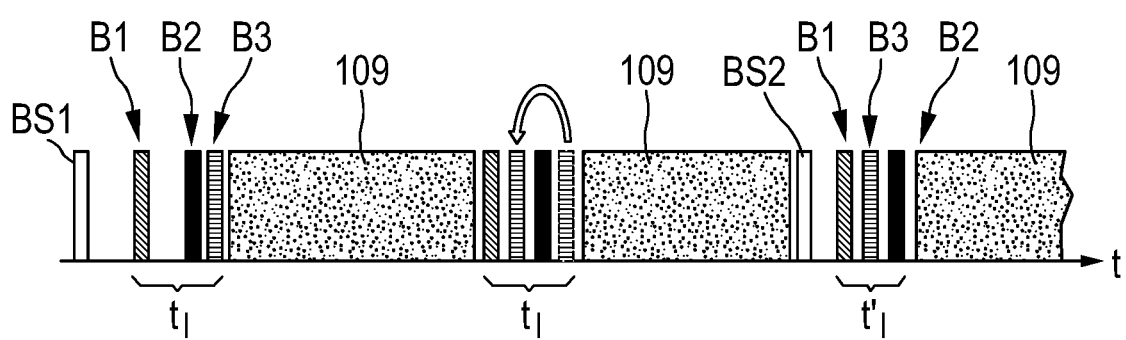
FIG. 6 shows a timeline indicating provision of radio beacon signals after the reception of the beacon-provision schedule.

FIG. 6 shows a time diagram indicating provision of beacon signals after the reception of the beacon-provision schedule BS1 in a wireless communication arrangement comprising three network nodes, each configured to provide a respective radio beacon signal B1, B2 and B3 in accordance with the beacon-provision schedule BS1. In this example, at least the network node providing the radio beacon signal B3 comprises a beacon monitoring unit that is configured to monitor time differences between reception of two consecutive radio beacon signals, and using the monitored time differences to determine whether a radio beacon signal can be provided between two given consecutive radio beacon signals. In FIG. 6, a time difference between the provision of radio beacon signals B1 and B2 is greater than a time difference between provision of radio beacon signals B2 and B3. In fact, the time difference between signals B1 and B2 is greater than the time needed to provide beacon radio signal B3. In this case, the time difference between B1 and B2 allows for the provision of a radio beacon signal B3 without interference. The beacon monitoring unit provides a shift signal to the radio-beacon provision unit, which is configured, upon reception of said shift signals, to provide the radio beacon signal between the two given consecutive radio signals B1 and B2. Optionally, the network node is advantageously configured to inform the network control of this shift, which is then configured to provide an updated beacon-provision schedule BS2 indicate of new rank-values and of a new time length $t'_l$ of the beacon-provision time-window, which is shorter than the original time length $t_l$.

This enables a broadening of the time window 109 for providing the wireless communication signals.

Figure 7:
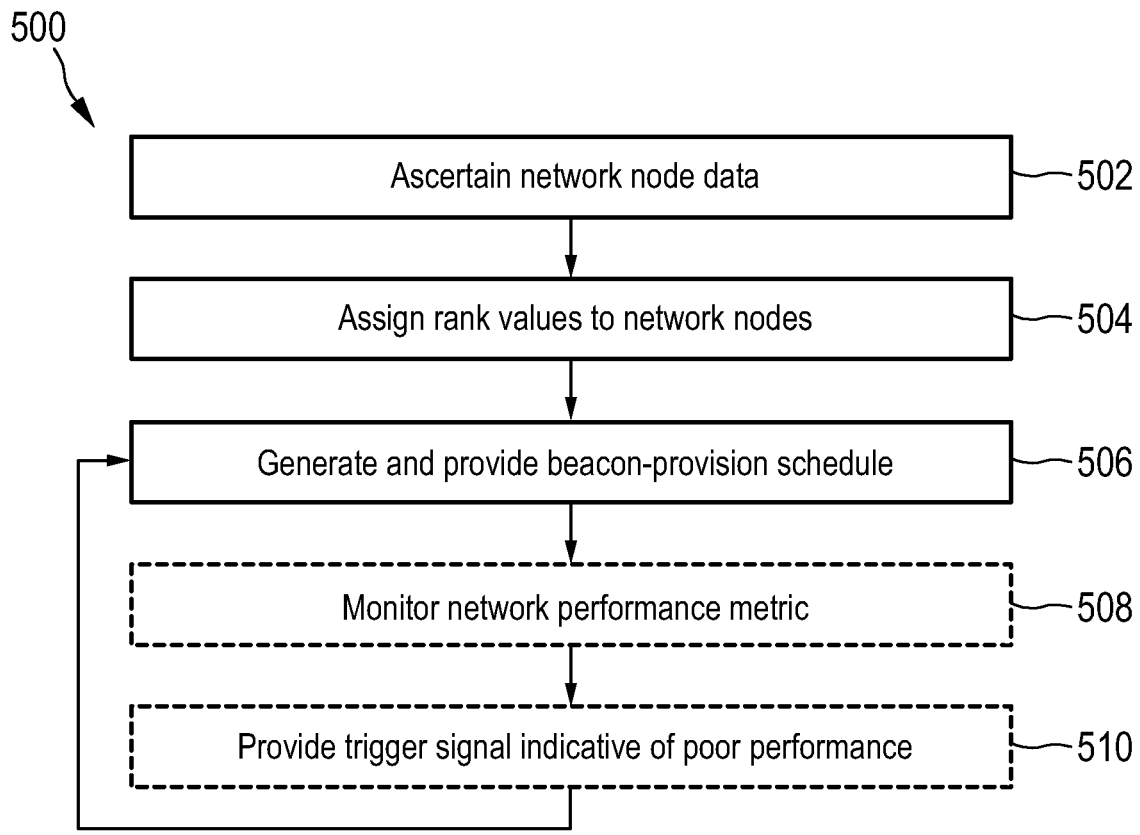
FIG. 7 shows a flow diagram of an embodiment of a method 500 for operating a network control node for controlling provision of radio beacon signals.

FIG. 7 shows a flow diagram of an embodiment of a method 500 for operating a network control node for controlling provision of radio beacon signals by a plurality of network nodes in a wireless communication arrangement. The method comprises, in a step 502, ascertaining network node data identifying the network nodes of the wireless communication arrangement. The method also comprises, in an optional step 504, and using the ascertained network node data, assigning to the network nodes of the wireless communication arrangement a rank-value indicative of a respective position in a beacon-provision sequence for periodically providing a radio beacon-signal. The method also comprises, in a step 506, generating and providing, to the network nodes, a beacon-provision schedule, optionally indicative of the respective rank-values and indicative of a periodical beacon-provision time-window having a predetermined time-window length for providing the respective radio beacon-signals in accordance with the respective rank-value when appropriate and predetermined timing instructions. The predetermined time-window length providing the respective radio beacon-signals is shorter than a beacon signal provision period of the provision of radio beacon signals by the network nodes.

Optionally, the method 500 also comprises, in a step 508, monitoring one or more predetermined network performance metrics of the wireless communication arrangement and, in a step 510, and upon determining that the network performance metric has a value outside a predetermined respective normal-operation range, providing a trigger signal indicative thereof.

Figure 8:
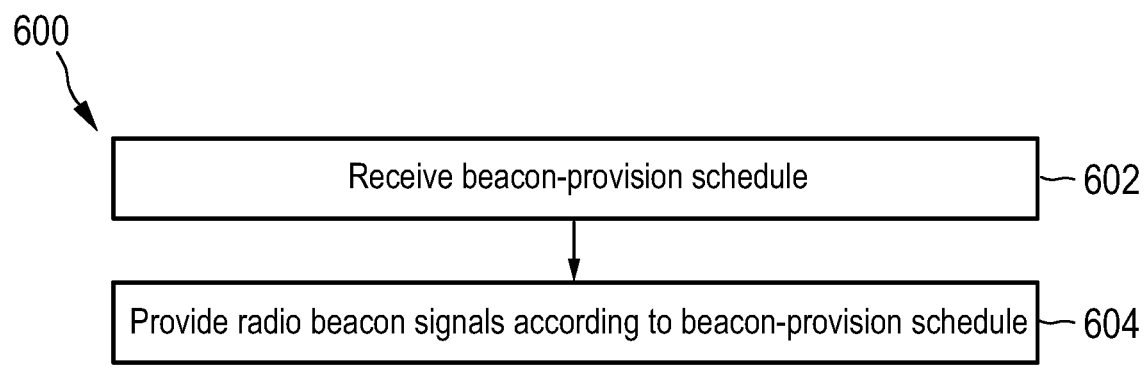
FIG. 8 shows a flow diagram of a particular embodiment of a method 600 for operating a network node.

FIG. 8 shows a flow diagram of a particular embodiment of a method 600 for operating a network node. The method comprises, in a step 602, receiving a beacon-provision schedule indicative of rank-values indicative of respective positions in a beacon-provision sequence for periodically providing a radio beacon-signal and indicative of a periodical beacon-provision time window having a predetermined time-window length, for providing the respective radio beacon-signals in accordance with the respective rank-values and predetermined timing instructions. The method also comprises, in a step 604, and upon reception of the beacon-provision schedule, providing the radio beacon signal only during the respective periodical beacon-provision time-window indicated by the beacon-provision schedule.

In summary, the invention is directed to a network control node for controlling provision of radio beacon signals by network nodes of a wireless communication arrangement. The network control node comprises a beacon-control unit connected to a network-data ascertainment unit and configured, using ascertained network node data identifying the network nodes, to assign to the network nodes of the wireless communication arrangement a rank-value indicative of a respective position in a beacon-provision sequence for periodically providing a radio beacon-signal and to generate and provide, to the network nodes, a beacon-provision schedule indicative of the respective rank-values and of a periodical beacon-provision time-window having a predetermined time-window length for providing the respective radio beacon-signals that is shorter than a beacon signal provision period of the provision of radio beacon signals by the network nodes thereby reducing the risk of signal collision.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfil the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A network control node, for controlling provision of radio beacon signals in a wireless communication arrangement, the radio beacon signals being provided in accordance with a wireless communication protocol, the network control node comprising:
    a network-data ascertainment unit configured to ascertain network node data identifying the network nodes of the wireless communication arrangement;
    a beacon-control unit connected to the network-data ascertainment unit and configured, using the ascertained network node data to generate and provide, to the network nodes, a beacon-provision schedule indicative of a periodical beacon-provision time-window having a predetermined time-window length ($t_l$) for providing the respective radio beacon-signals that is shorter than a beacon signal provision period of the provision of radio beacon signals by the network nodes in accordance with the wireless communication protocol, and
    a beacon-analysis unit connected to the beacon-control unit and configured:
        to receive the beacon-provision schedule;
        to receive radio beacon signals provided by the network nodes; and
        upon determining that one or more of the radio beacon signals have been transmitted by a respective network node outside the beacon-provision time-windows, to provide a timing-error signal indicative thereof; and
    wherein the beacon-control unit is further configured to provide, to the network nodes, the beacon-provision schedule upon reception of the timing-error signal.

2. The network control node of claim 1, wherein the beacon control unit is further configured
    to assign to the network nodes of the wireless communication arrangement a rank-value indicative of a respective position in a beacon-provision sequence for periodically providing a radio beacon-signal; and
    to generate and provide the beacon provision schedule being further indicative of the respective rank-values for providing the respective radio-beacon signals in accordance with said respective rank-values.

3. The network control node of claim 1, further comprising a network performance monitoring unit that is configured:
    to monitor one or more predetermined network performance metrics of the wireless communication arrangement; and upon determining that the network performance metric has a value outside a predetermined respective normal-operation range, to provide a trigger signal indicative thereof; and wherein the beacon-control unit comprises a trigger input unit (208) for receiving the trigger signal, and is further configured to provide the beacon-provision schedule upon reception of the trigger signal.

4. The network control node of claim 1, further comprising:
a user input unit connected to beacon-control unit and configured, upon reception of a user input signal indicative of a request to provide the beacon-provision schedule, to provide a trigger signal indicative thereof; and wherein
the beacon-control unit comprises a trigger input unit for receiving the trigger signal, and is further configured to provide the beacon-provision schedule upon reception of the trigger signal.

5. The network control node of claim 1, wherein the beacon-control unit is configured to provide the beacon-provision also comprising timing-data indicative of respective points in time for providing the radio-beacon signal by the network nodes, the respective points in time being relative to a time of reception of the beacon-provision schedule by the respective network node or to a starting time of the beacon-provision time-windows.

6. The network control node of claim 1, wherein the beacon-control unit is further configured:
to provide to the network nodes of the wireless communication arrangement, a communication-stop signal indicative of a requirement to the network nodes to stop transmission of wireless signals for a predetermined silence time-span; and
to provide the beacon-provision schedule during the silence time-span.

7. The network control node of claim 1, further comprising:
an emitter unit configured to provide wireless testing signals to the one or more of the network nodes of the wireless communication arrangement;
a transmission determination unit configured to determine whether or not the wireless testing signals have been received by the one or more network nodes and to provide a result signal indicative thereof; and wherein
the beacon-control unit is further configured to provide the beacon-provision schedule upon reception of the result signal indicative of a failure to receive the wireless testing signals.

8. A wireless communication arrangement, comprising:
one network control node in accordance with claim 1
two or more network nodes for communicating in a wireless communication arrangement, each network node comprising:
a radio-beacon provision unit configured to provide, in accordance with a first wireless communication protocol, radio beacon signals comprising network node data identifying the network node; and
an input unit for receiving, from an external network control node, a beacon-provision schedule indicative of a periodical beacon-provision time window having a predetermined time-window length, for providing the respective radio beacon-signals, that is shorter than a beacon signal provision period of the provision of radio beacon signals by the network nodes; wherein
the radio-beacon provision unit is connected to the input unit and configured, upon reception of the beacon-provision schedule, to provide the radio beacon signal only during the respective periodical beacon-provision time-window indicated by the beacon-provision schedule.

9. The wireless communication arrangement of claim 8, wherein each network node further comprises a communication-signal provision unit connected to the input unit and configured to provide, in accordance with the first wireless communication protocol or with a second wireless communication protocol different than the first wireless communication protocol, and upon reception of the beacon-provision schedule, wireless communication signals outside the beacon-provision time-windows.

10. The wireless communication arrangement of claim 8, wherein the radio-beacon provision unit is further configured to periodically provide radio beacon signals at a predetermined point in time within the beacon-provision time-window that depends on a rank-value assigned to the network node in the beacon-provision sequence.

11. The wireless communication arrangement of claim 8; wherein the radio-beacon provision unit is further configured:
upon determining, based on a rank-value, that the network node has a first position in the beacon-provision sequence, to provide a first radio beacon signal upon reception of the beacon-provision schedule and to provide subsequent radio beacon signals spaced in time a period of the periodical beacon-provision time-window; and
upon determining, based on the rank-value, that the network node has a position in the beacon-provision sequence other than the first position, to provide a respective radio beacon signal upon reception of that radio beacon signal provided by that network node with an immediately preceding position in the beacon-provision sequence.

12. A method for operating a network control node for controlling provision of radio beacon signals by a plurality of network nodes in a wireless communication arrangement, the radio beacon signals being provided in accordance with a wireless communication protocol, the method comprising:
ascertaining network node data identifying the network nodes of the wireless communication arrangement;
using the ascertained network node data, generating and providing, to the network nodes, a beacon-provision schedule indicative of a periodical beacon-provision time-window having a predetermined time-window length for providing the respective radio beacon-signals that is shorter than a beacon signal provision period of the provision of radio beacon signals by the network nodes in accordance with the wireless communication protocol;
receiving the beacon-provision schedule;
receiving radio beacon signals provided by the network nodes; and
upon determining that one or more of the radio beacon signals have been transmitted by a respective network node outside the beacon-provision time-windows, to providing a timing-error signal indicative thereof and providing, to the network nodes, the beacon-provision schedule upon reception of the timing-error signal.

13. A non-transitory computer-readable medium comprising instructions which, when executed by a computer, cause the computer to carry out the method of claim 12.

* * * * *